United States Patent
Breu et al.

[11] Patent Number: 5,263,753
[45] Date of Patent: Nov. 23, 1993

[54] GRIPPER FOR A MANIPULATOR

[75] Inventors: Gerhard Breu, Oberwangen; Peter Spycher, Zürich, both of Switzerland

[73] Assignee: A.R.T. Applied Robot Technology Ltd., Schlieren, Switzerland

[21] Appl. No.: 852,974

[22] Filed: Mar. 17, 1992

[30] Foreign Application Priority Data

Sep. 16, 1991 [FR] France .................. 91115692

[51] Int. Cl.⁵ ............................................. B25B 5/04
[52] U.S. Cl. ........................... 294/99.1; 294/88; 901/37
[58] Field of Search ............ 294/99.1, 88, 119.3, 294/93, 98.1; 901/37, 38

[56] References Cited

U.S. PATENT DOCUMENTS

| | | | |
|---|---|---|---|
| 3,923,191 | 12/1975 | Johnson | 220/94 |
| 4,173,365 | 11/1979 | Lieb | 294/99.1 X |
| 4,667,997 | 5/1987 | Udagawa et al. | 294/99.1 X |
| 4,671,553 | 6/1987 | Bertini | 294/99.1 X |

FOREIGN PATENT DOCUMENTS

| | | |
|---|---|---|
| 0290218 | 3/1988 | European Pat. Off. . |
| 368777 | 10/1989 | European Pat. Off. . |
| 218304 | 6/1985 | Fed. Rep. of Germany ..... 294/99.1 |
| 9111378 | 1/1991 | PCT Int'l Appl. . |
| 624789 | 9/1978 | U.S.S.R. ......................... 294/99.1 |
| 844175 | 7/1981 | U.S.S.R. ......................... 294/99.1 |
| 1110628 | 8/1984 | U.S.S.R. ......................... 294/99.1 |
| 1288053 | 2/1987 | U.S.S.R. . |
| 1316817 | 6/1987 | U.S.S.R. . |

OTHER PUBLICATIONS

IBM Technical Disclosure Bulletin, Feb. 1978, vol. 20, No. 9, pp. 3387-3388.

*Primary Examiner*—Joseph D. Pape
*Attorney, Agent, or Firm*—Walter C. Farley

[57] ABSTRACT

The gripper (1) has gripping arms (8), which are located on a membrane (3). Between the grippers the membrane has an area (14), which is movable roughly at right angles to the membrane. Through the movement of this area the gripping arms can be inclined relative to each other and can pick up an article (15).

5 Claims, 3 Drawing Sheets

GRIPPER FOR A MANIPULATOR

FIELD OF THE INVENTION

This invention relates to a gripper for a manipulator with several gripping arms for picking up articles.

BACKGROUND OF THE INVENTION

Such a gripper is e.g. known from European patent application 368 777. This gripper has a pneumatic drive enabling the gripping arms to be moved. The pneumatic drive comprises rods, a pneumatic cylinder and a compressed air source connected thereto by means of valves.

The disadvantage of such a gripper is that it comprises several components which cooperate with one another. Therefore the gripper is heavy, expensive and requires complicated maintenance, because it is constantly necessary to ensure an adequate lubrication of the joints and that the important gaps are kept clean.

SUMMARY OF THE INVENTION

The present invention solves the problem of providing a gripper which is simple in construction and free from maintenance.

The advantages achieved by the invention are that such a gripper is inexpensive to manufacture and free from maintenance. It can also be easily replaced as a result of the very simple construction. For example, it can be fitted to a robot arm in place of a suction gripper, because it can operate with the same drive. As it only has one movable part and the gripping arms do not have joints, it is particularly suitable for use in clean rooms. The essential part of such a gripper can also be easily cleaned or even sterilized and can therefore be used in the food industry or in the manufacture of electronic components such as integrated circuits.

The invention is described in greater detail hereinafter relative to a described embodiment and the attached drawings, wherein:

DESCRIPTION OF THE PREFERRED EMBODIMENTS

Figure 1:
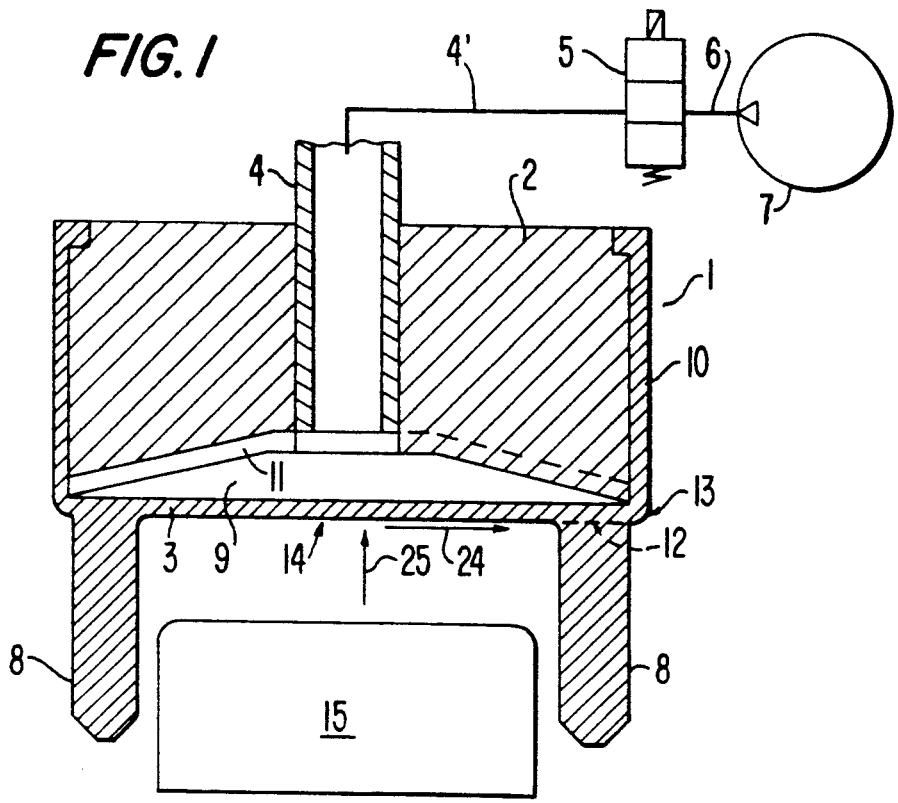
FIG. 1 is a side elevation, in section, through a gripper in accordance with the invention in a first position.

FIG. 1 shows a gripper 1 in section, which comprises a support element 2 and a membrane 3, as well as a drive element 4, which is here constructed as a tube, which is known by itself and is connected to a conventional vacuum pump in a known manner. However, a further schematically indicated portion 4' of the tube 4 is shown, which is connected to a control valve 5. By means of a line 6 the control valve 5 is connected to a pump 7 for a fluid pump such as a vacuum pump. The drive element 4 with the portion 4', the control valve 5, the line 6 and the pump 7 forms the drive for the membrane 3. The gripper 1 has gripping arms 8, which are firmly connected to the membrane 3. Together with the membrane 3 the support element 2 forms a gap 9, which is connected to the drive element 4, i.e. the tube and consequently to the drive. Membrane 3, which is circular in this embodiment, is connected in one piece to a fastening wall 10, which laterally surrounds the cylindrical support element 2, so that the gap 9 is sealed with respect to the outside. The support element 2 also has radially directed ducts 11, which facilitate movement of the fluid, as will be shown hereinafter. A distinction is made between a first area 12 of the membrane 3 where the gripping arms 8 are fixed, a second area 13 where the membrane 3 is fixed to the bearing element and a third area 14 located between the gripping arms. Upstream of the third area 14 articles 15 can be laterally picked up by the gripping arms 8. The arrangement shown here is specifically part of a manipulator, such as e.g. an industrial robot and is appropriately integrated into the latter, in that e.g. the gripper 1 is placed on a movable arm, while the control valve 5 and the pump 7 or the drive are fixed.

Figure 2:
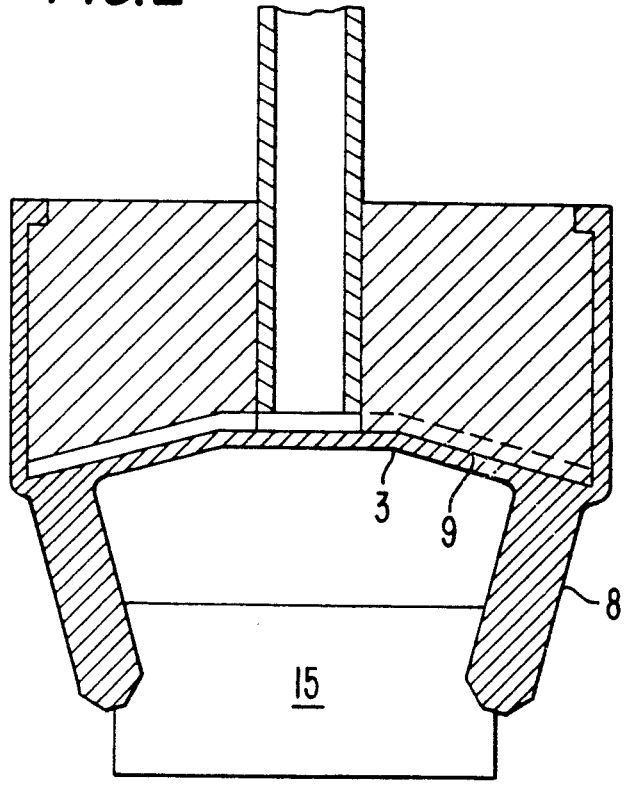
FIG. 2 is a side elevation, in section, through the gripper according to FIG. 1 in a second position.

FIG. 2 shows the gripping arms 8 in a position in which an article 15 is picked up. This is achieved in that the fluid is sucked out of the gap 9. The third area 14 of the membrane 3 is applied to the bearing element 2 and is conically deformed in this example of a circular membrane 3, so that the gripping arms 8 are inclined relative to each other. When the membrane 3 is pulled against the support element 2, fluid flow is only possible through the ducts 11.

Figure 3:
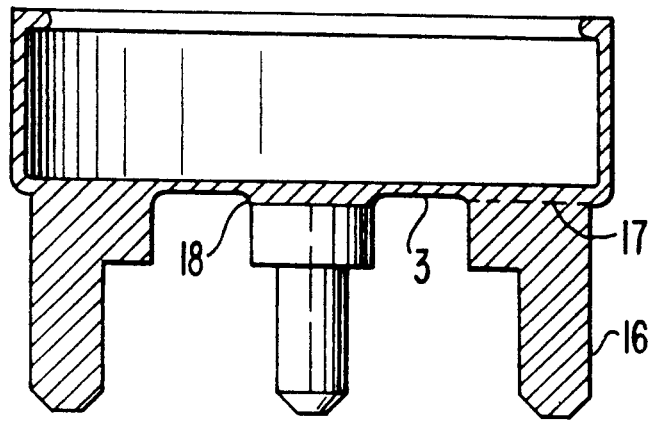
FIG. 3 is a side elevation, in section, of another embodiment of part of the gripper.

FIG. 3 shows a membrane 3 with gripping arms 16, which are supported by means of a widened base surface 17 on the membrane 3, so that the gripping arms 16 can exert higher forces against one another. It is also possible to see a reinforcement 18 of the membrane 3 in its third area 14.

Figure 4:
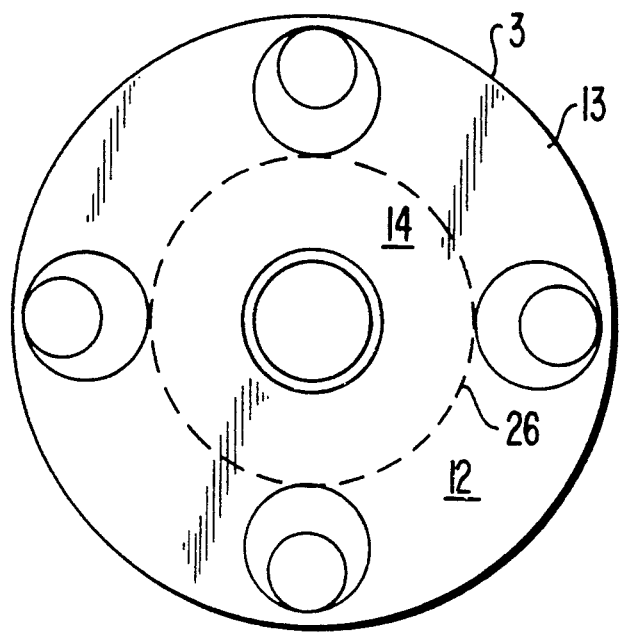
FIG. 4 is a bottom plan view of the gripper part according to FIG. 3.

FIG. 4 shows the membrane 3 of FIG. 3 in plan view which shows the first area 12, which extends in roughly circular manner around the central, circular, third area 14. The third area 14 is defined against the first area 12 by the broken line 26. The first area 12 is defined with respect to the outside by the second area 13.

Figure 5:
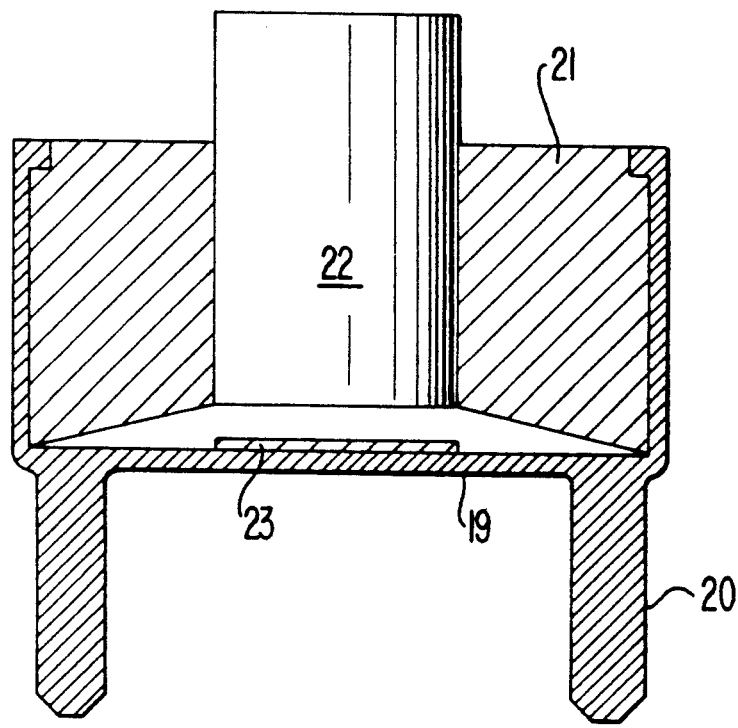
FIG. 5 is a side elevation, in section, of another embodiment of the gripper.

FIG. 5 shows another gripper embodiment with the membrane 19, the gripping arms 20 and a support element 21. The drive for the membrane 19 is here an electromagnet 22, which can be switched on and off in known and therefore not shown manner and for this purpose a metal part 23 is provided on the membrane 19. By switching the electromagnet on and off the metal part 23 and therefore the membrane 19 are drawn onto the electromagnet 22, and when it is deenergized the spring-elastic restoring forces exerted by the membrane 19 allows it to return to the indicated position and in this way the gripping arms 20 are moved.

The drawings clearly show that the membrane 3, 19 has its greatest extension in the direction indicated by an arrow 24. As a result of the described nature of the support and as a result of its own elasticity, which is a prerequisite for the desired operation, the third area 14 can be moved in a direction which is at right angles or substantially at right angles to the direction 24, as indicated by an arrow 25 (FIG. 1). As a result in the case of a circular third area 14, the first area 12 is conically deformed.

As stated, pneumatic and electromagnetic drives can be used for the membranes, but other drive types are also possible.

We claim:

1. A gripper for a manipulator comprising the combination of a support member;

means at an end of said support member defining a concave recess having a surface and an edge;

a flexible membrane attached to said support member at said edge of said recess and extending across said recess, thereby defining a volume between said membrane and said support member;

a ferromagnetic member at a central portion of said membrane;

a plurality of gripper arms attached to said membrane adjacent the periphery thereof and extending away from said support member; and means for uniformly and selectively flexing said membrane toward and away from said support member to thereby concurrently incline said gripper arms toward or away from each other with sufficient force to engage and grip or release an object, said means for flexing comprising an electromagnet carried by said support member and energizable to attract said ferromagnetic member so that said means for flexing acts on said central portion of said membrane.

2. A gripper for a manipulator comprising the combination of a generally cylindrical support member;

means at an end of said support member defining a concave recess having a surface and an edge;

a flexible membrane attached to said support member at said edge of said recess and extending across said recess, thereby defining a volume between said membrane and said support member;

a plurality of gripper arms attached to said membrane adjacent the periphery thereof and extending away from said support member; and means for uniformly and selectively flexing said membrane toward and away from said support member to thereby concurrently incline said gripper arms toward or away from each other with sufficient force to engage and grip or release an object, said means for flexing comprising a passage extending through said support member and communicating with said volume defined between said support member and said membrane, and means acting through said tube for altering fluid pressure within said volume relative to ambient pressure, thereby uniformly flexing the entire membrane within said edge and concurrently inclining all of said gripper arms in the same direction relative to a central axis of said membrane.

3. A gripper according to claim 2 wherein said recess edge is circular and comprising at least three gripper arms uniformly spaced around the periphery of said membrane adjacent said edge.

4. A gripper according to claim 2 wherein said recess includes means defining a plurality of radial slots in said recess surface communicating with said passage.

5. A gripper for a manipulator comprising the combination of a plurality of gripping arms;

a flexible membrane attached to and supporting said gripping arms in a first area of the membrane;

a support element attached to said membrane in a second area of said membrane, said support element and said membrane defining a single gap therebetween, said membrane being deformable to close and open said gap and to incline said gripping arms toward each other;

a generally cylindrical hollow body surrounding said support element, said hollow body having a distal edge adjacent said edge of said recess, said distal edge being unitarily formed with and continuously attached to said membrane, thereby forming a continuous enclosure for said support member and said recess, and a single drive for deforming said membrane uniformly, said drive comprising a tube communicating with said gap and means for acting through said tube for altering the fluid pressure within said gap to adjust the deformation of said membrane selectively to simultaneously incline said gripping arms toward each other and away from each other to release or grasp an object.

* * * * *